Jan. 26, 1937.  J. BALTON  2,069,027
METHOD OF MANUFACTURING CUP PASTRY
Filed Dec. 24, 1935
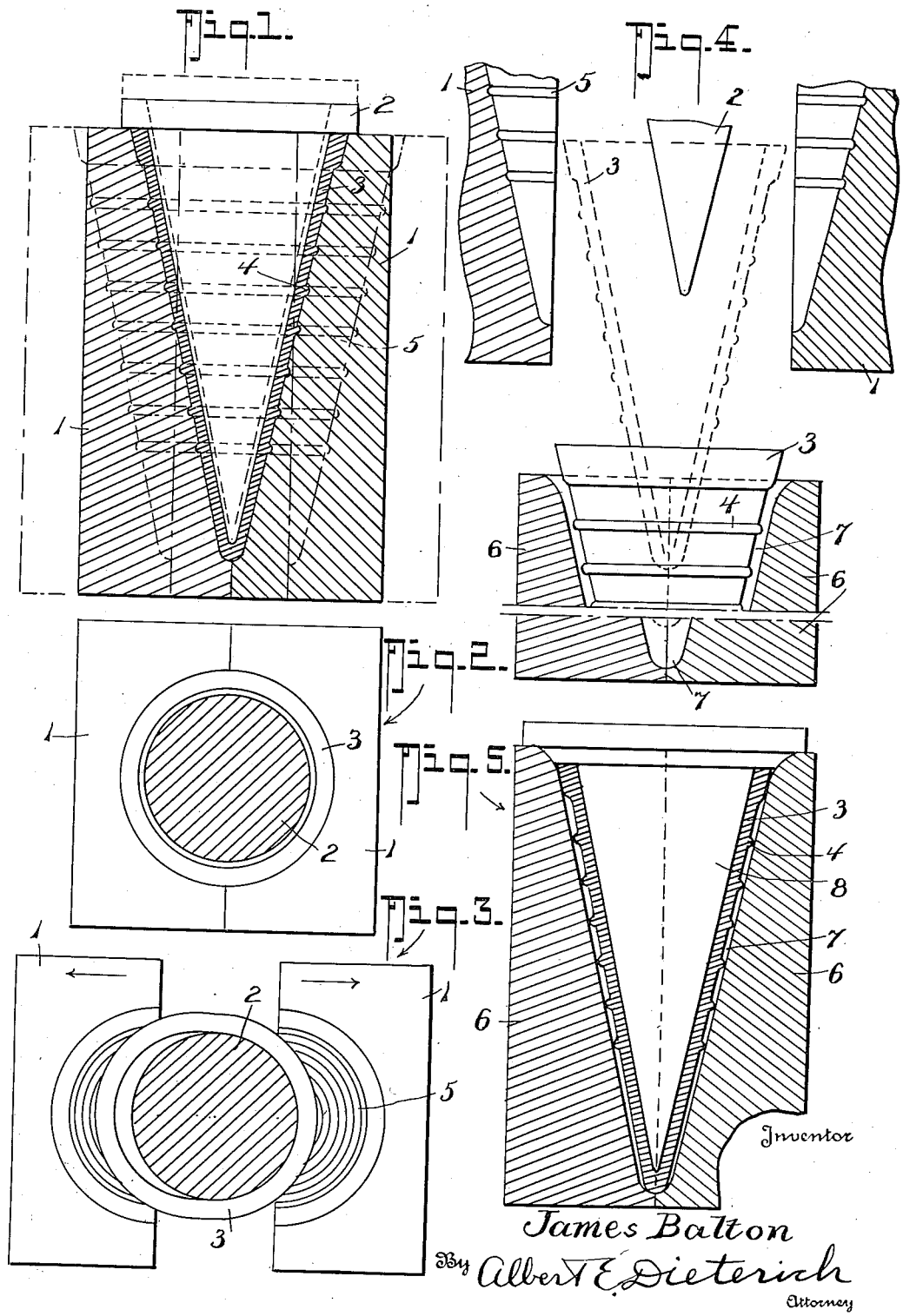
Inventor
James Balton
By Albert E. Dieterich
Attorney Patented Jan. 26, 1937

2,069,027

UNITED STATES PATENT OFFICE 2,069,027

METHOD OF MANUFACTURING CUP PASTRY

James Balton, Baltimore, Md., assignor of one-fourth to Joseph Shapiro, Baltimore, Md., one-fourth to Isaac Shapiro, Chicago, Ill., one-fourth to Samuel Shapiro, and one-fourth to Nathan Shapiro, both of Chelsea, Mass.

Application December 24, 1935, Serial No. 56,111

6 Claims. (Cl. 107—54)

The present invention relates to the art of manufacturing cup pastry and other forms for holding ice cream and similar edible products. Ice cream cones and other cup pastries are today usually made by baking the batter in suitable baking molds. It is a well recognized fact that the greater the sugar content of the batter (other things being equal) the greater the adhesion of the batter-product to the molds and the more difficult its extraction from the molds.

Furthermore, batter having a high sugar content sets less rapidly than that having less sugar content. This is perhaps due to the "candying" effect of the sugar. Because of the greater tendency of cones of high sugar content to adhere to the molds, and the consequent difficulty of extraction of the cones from the molds, it has been the practice to bake highly sweetened cones in the form of wafers on flat baking plates and then, while the wafers are still hot and pliable, to roll them around conical mandrels to give the required form. Such cones are commonly called "rolled cones". Since rolled cones are so much sweeter than the average molded cone, the public has, from time to time, indicated a preference for the rolled cone. The rolled cone, however, has, mechanically, many imperfections, one of the chief of which is the fact that the cone will not retain its shape under varying atmospheric conditions. Frequently the roll opens up sufficiently to cause leakage of the melted ice cream, with consequent messing of the hand of the consumer. For this reason, notwithstanding the superior edible quality of the article, the rolled cone has not supplanted the less sweetened molded cone.

My present invention has for its object to provide a method by which highly sweetened batter can be used to produce molded sugar cones as well as rolled sugar cones, and thereby produce an article which will compete readily with the rolled sugar cone, not only from the standpoint of flavor or taste, but also from the standpoint of mechanical structure. To this end I propose to bake the batter in the usual split baking molds with cores and to extract the baked cones by the well known "Bruckman" method, as now practised for ordinary molded cones. Extracting the cones by the "Bruckman" method causes the cones to become distorted, due to the pull of the core as the mold sections are separated, and due to the greater adhesion of the cone to the female mold walls. In extracting cones by the "Bruckman" method the distortion causes them to assume a somewhat elliptical cross section instead of a true circular cross section. As the amount of distortion varies, it consequently follows that the cones extracted are of various cross sectional shapes, which is of course a drawback to their sale.

In order to overcome this difficulty I provide what I term a reshaping mold consisting of a split female member and a core or male member which receives the cone as it is discharged from the baking molds and presses it back to its circular cross section and at the same time assists in cooling the cone to enable it to become set before extracting it from the reshaping mold—which extraction may also be performed by the "Bruckman" method.

In order to arrive at a clearer understanding of my method, reference may be made to the accompanying drawing in which:

Figure 1 is a diagrammatic cross sectional view of a split baking mold and its core with a baked cone ready for extraction; the first step of the "Bruckman" extraction procedure (slight lifting of the core) being indicated in dotted lines, and the second step (separation of the female mold sections) being indicated in dot and dash lines.

Figure 2 is a top plan view of the structures shown in Figure 1, the core in its slightly lifted position being indicated in cross section.

Figure 3 is a view similar to Figure 2, showing the mold sections separating and indicating the distortion of the cross sectional form of the cone.

Figure 4 is a view similar to Figure 1, showing the cone being discharged in dotted lines and the cone having been discharged into the reshaping mold in full lines.

Figure 5 shows the cone in the reshaping mold after it has been pressed back to circular cross sectional shape by means of the reshaping core.

In the drawing 1—1 indicates the split female baking mold sections, 2 the core therefor, 3 the baked cone, 4 the ribbing or ornamental design on the outer surface of the baked cone, and 5 the grooves in the female mold walls which produce the ornamentation on the outer wall of the cone.

In Figures 4 and 5 the reshaping and cooling mold sections are indicated by 6—6, the smooth surface conical socket of the female mold is indicated by 7, and the reshaping core is indicated by 8.

It is of course to be understood that the baking molds are suitably designed for being heated and are kept hot in any of the usual ways for the purpose of baking the batter. On the other hand, the reshaping molds are unheated and, in fact, may be provided with cooling means of any approved construction to assist in quickly cooling and setting the cones pressed into the reshaping molds.

In carrying out the invention the batter is introduced into the closed female mold 1—1, the core is inserted to spread the batter and assist in baking the same, the core and mold being spaced apart a sufficient distance to provide the required cross section of the cone. After the batter has been baked the proper length of time the molds are opened according to the "Bruckman" extraction procedure and the hot and pliable cone is conducted into the female reshaping mold 6, whereupon the reshaping core is inserted and the cone pressed down into the mold cavity 7 to bring it back to its circular cross sectional form. It is to be observed that the reshaping mold does not have its cavity wall grooved, as does the baking mold, and the size of the conical cavity of the reshaping mold is sufficiently larger than that of the baking mold to receive the cone and reshape it without substantially mashing the ribbing on the outside of the cone.

After the cone has been reshaped in the reshaping mold and cooled down sufficiently to become set (i. e., to be form sustaining), it is discharged from the cooling mold in any suitable way, preferably by the "Bruckman" extraction procedure. In this way a highly sweetened sugar cone can be produced which is far superior to the rolled sugar cone because it will not leak, and which will maintain its form when stacked and packed in the manner of stacking and packing the ordinary molded cones.

From the foregoing description, taken in connection with the accompanying drawing, it is thought that the construction, operation and advantages of the invention will be clear to those skilled in the art to which it appertains.

What I claim is:

1. The method of manufacturing cup pastry having a high sugar content, which consists first in molding and baking the pastry in a split baking mold with a core, extracting the baked pastry from the baking mold and depositing the pastry in a reshaping mold, and thereafter extracting the reshaped pastry from the reshaping mold.

2. The method of manufacturing cup pastry having a high sugar content, which consists in first molding and baking the pastry in a split baking mold with a core, extracting the pastry from the baking mold and depositing it while still hot and pliable in a reshaping and cooling mold until it becomes set, and then extracting the reshaped pastry from the reshaping mold.

3. The method of manufacturing cup pastry with high sugar content batter, which consists of the following steps: first, molding and baking the batter in a split mold with a core, extracting the baked product from the mold by the "Bruckman" method; secondly, delivering the baked pastry from the baking mold while still hot and pliable into a reshaping mold and forcing the cone into the reshaping mold to restore it to its proper shape; thirdly, allowing the pastry to remain in the reshaping mold until it becomes set; and fourthly, discharging the pastry from the reshaping mold.

4. The method of manufacturing cup pastry made from high sugar content batter, which consists in molding and baking the batter in a split mold with a core and extracting the baked pastry from said mold and core by the "Bruckman" method; then, while the pastry is still hot and pliable, depositing it in a cooling and reshaping mold and with a core reshaping the pastry to restore it to its initial form; and then allowing the pastry to cool and become set in the reshaping mold, and extracting it from the reshaping mold.

5. The method of manufacturing cup pastry made from high sugar content batter, which consists in molding and baking the batter in a split mold with a core and extracting the baked pastry from said mold and core by the "Bruckman" method; then, while the pastry is still hot and pliable, depositing it in a cooling and reshaping mold and with a core reshaping the pastry to restore it to its initial form; and then allowing the pastry to cool and become set in the reshaping mold, and extracting it from the reshaping mold by the "Bruckman" method.

6. The method of making cup pastry from high sugar content batter which consists of molding and baking the batter in a true cone, removing the cone from the mold, and then remolding the cone to remove any distortion in shape that may have occurred during the removal of said cone from the mold.

JAMES BALTON.